United States Patent [19]

Oshita et al.

[11] Patent Number: 4,957,181

[45] Date of Patent: Sep. 18, 1990

[54] ELECTRIC POWER STEERING SYSTEM

[75] Inventors: Saiichiro Oshita; Toyohiko Mouri, both of Ohta, Japan

[73] Assignee: Fuji Jukogyo Kabushiki Kaisha, Tokyo, Japan

[21] Appl. No.: 449,131

[22] Filed: Dec. 8, 1989

Related U.S. Application Data

[63] Continuation of Ser. No. 198,393, May 24, 1988, abandoned.

[30] Foreign Application Priority Data

May 25, 1987 [JP]  Japan .................... 62-127427

[51] Int. Cl.$^5$ ............................. B62D 5/04
[52] U.S. Cl. .................... 180/79.1; 180/142; 318/434; 318/448; 318/489; 364/424.05
[58] Field of Search ............ 180/79.1, 79, 141, 142, 180/143; 318/434, 448, 488, 489; 361/31; 364/424.05

[56] References Cited

U.S. PATENT DOCUMENTS

| 4,664,211 | 5/1987 | Oshita et al. | 180/142 |
| 4,674,587 | 6/1987 | Suzuki et al. | 180/79.1 |
| 4,688,655 | 8/1987 | Shimizu | 180/79.1 |
| 4,735,271 | 4/1988 | Shimizu | 180/142 X |
| 4,754,829 | 7/1988 | Shimizu | 180/142 X |

FOREIGN PATENT DOCUMENTS 45-41246 12/1970 Japan .
61-98675 5/1986 Japan .

Primary Examiner—Mitchell J. Hill
Attorney, Agent, or Firm—Martin A. Farber

[57] ABSTRACT

A system having a motor operatively connected to a steering system for reducing the steering effort. The system is provided with a torsion torque sensor provided for detecting torsion torque generated in the steering system in a steering operation, and a steering angle sensor provided for detecting steering angle. In response to the output signal of the torsion torque sensor, an assist signal is produced, and in response to the output of the steering angle sensor, a damping signal dependent on the steering speed of a steering wheel is produced. The damping signal is increased with an increase of vehicle speed. A corrected damping signal is added to the assist signal, thereby damping movement of the steering wheel.

8 Claims, 4 Drawing Sheets

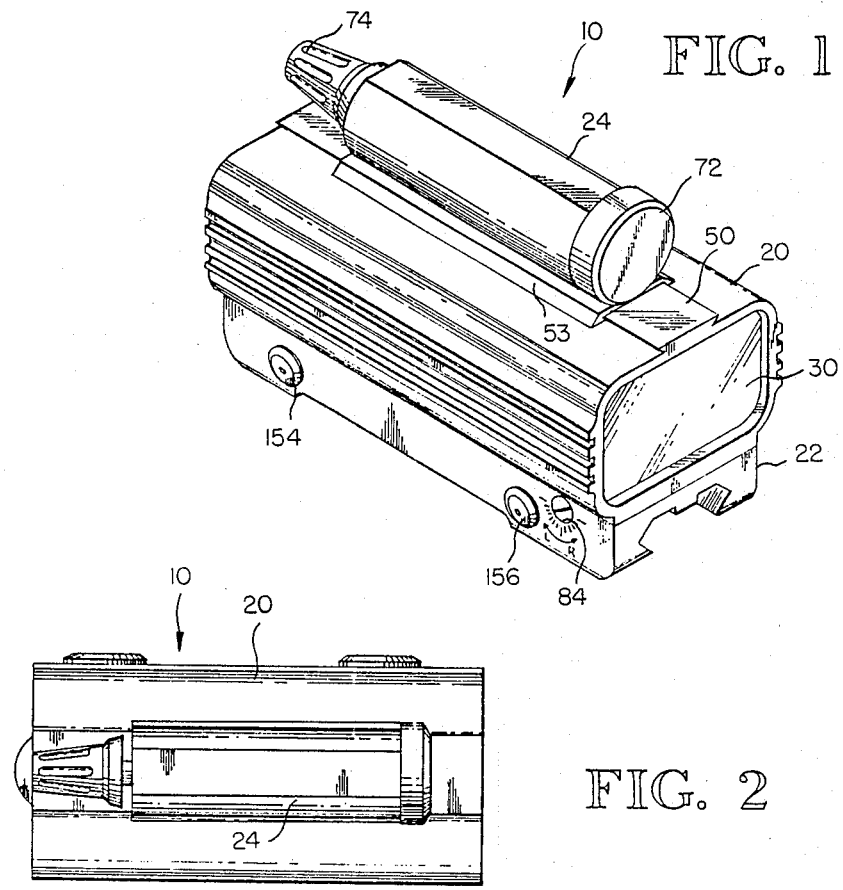
FIG. 1
FIG. 2
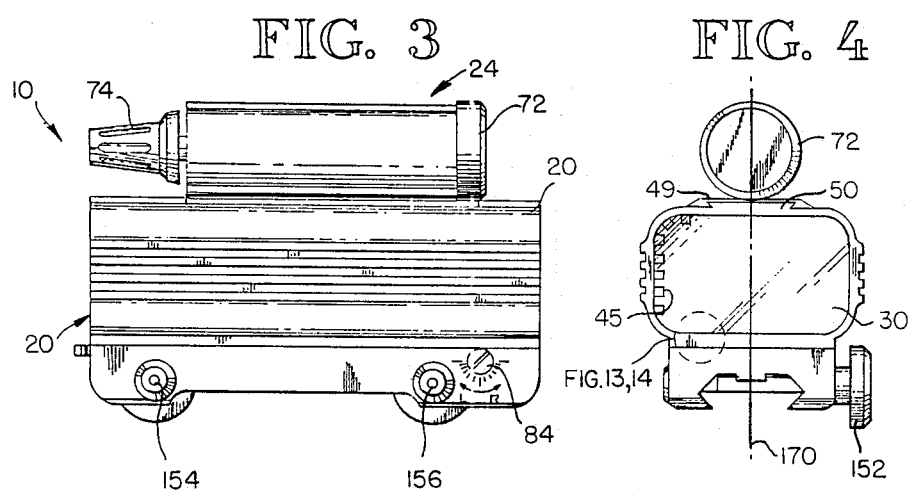
FIG. 3
FIG. 4

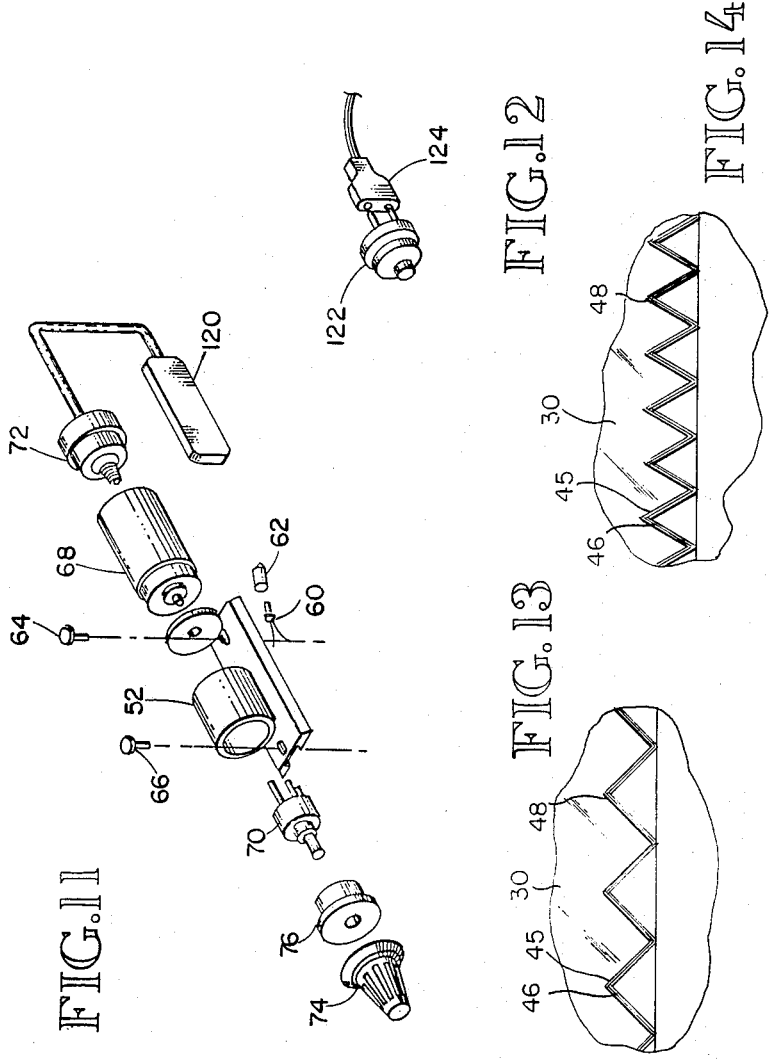

ELECTRIC POWER STEERING SYSTEM

This application is a continuation of our co-pending application Ser. No. 07/198,393 filed May 24, 1988, now abandoned.

BACKGROUND OF THE INVENTION

The present invention relates to an electric power steering system for a motor vehicle, and more particularly to a system for controlling a motor in accordance with the turning of a steering wheel.

The electric power steering system has a torsion torque sensor for measuring torsion torque in a steering shaft. The system is adapted to produce an assist signal to control the rotational direction and torque of a motor in a dependency on a torque signal from the sensor (Japanese Patent Application Publication 45-41246). The response of the steering system and the returnability of the steering wheel may deteriorate because of the inertia of the motor, the friction of a reduction gear train provided in the system, and other factors.

There has been proposed a control system which may prevent the above-described disadvantages (U.S. Pat. No. 4,664,211). The system is provided for producing an assist signal dependent on the torsion torque signal from the torsion torque sensor and on the vehicle speed, a return torque signal depending on an output signal of a steering angle sensor for returning the steering wheel to a neutral position, and a damping signal depending on the angular speed of a steering wheel. These signals are added for controlling the motor.

In such a system, if the damping force is set to a large value for stabilizing the steering wheel at high vehicle speed driving, the convergency of the steering wheel at low speed driving deteriorates. To the contrary, if the damping force is set to a value for improving the convergency at the low speed driving, a long converging time occurs at high speed driving.

SUMMARY OF THE INVENTION

The object of the present invention is to provide a system which may improve the convergency of the steering wheel in a wide vehicle speed range.

The other objects and features of this invention will become understood from the following description with reference to the accompanying drawings.

DETAILED DESCRIPTION OF THE PREFERRED EMBODIMENT

Figure 5:
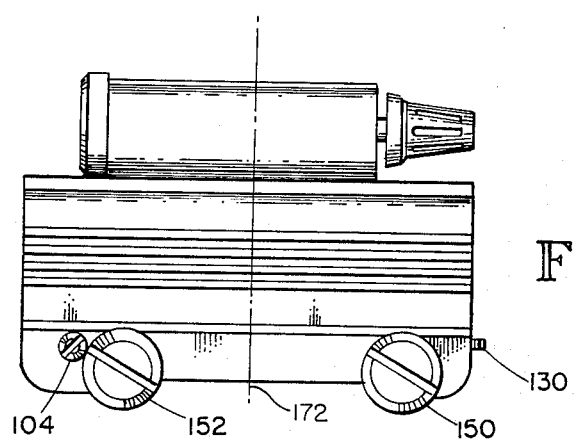
Figure 6:
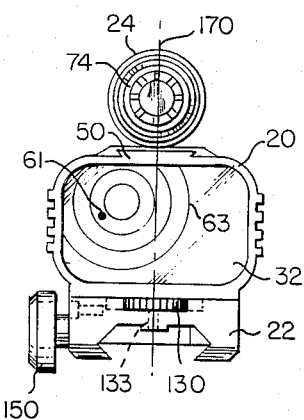
Figure 7:
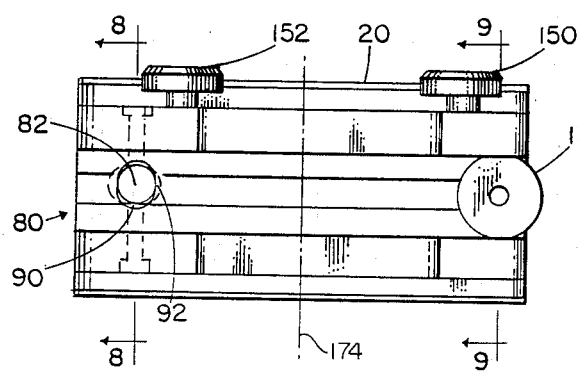
Figures 8, 9:
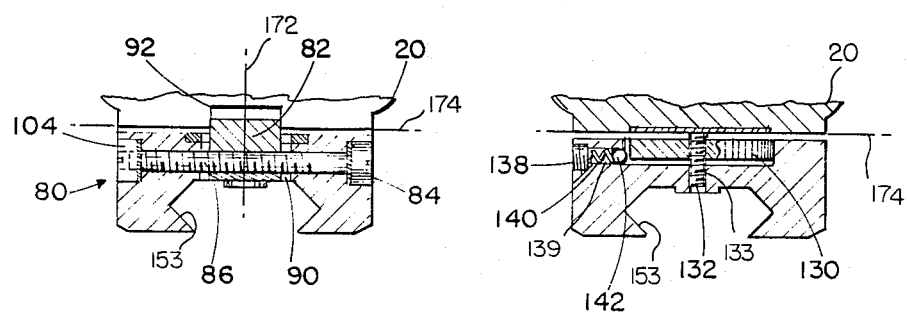
Figure 10:
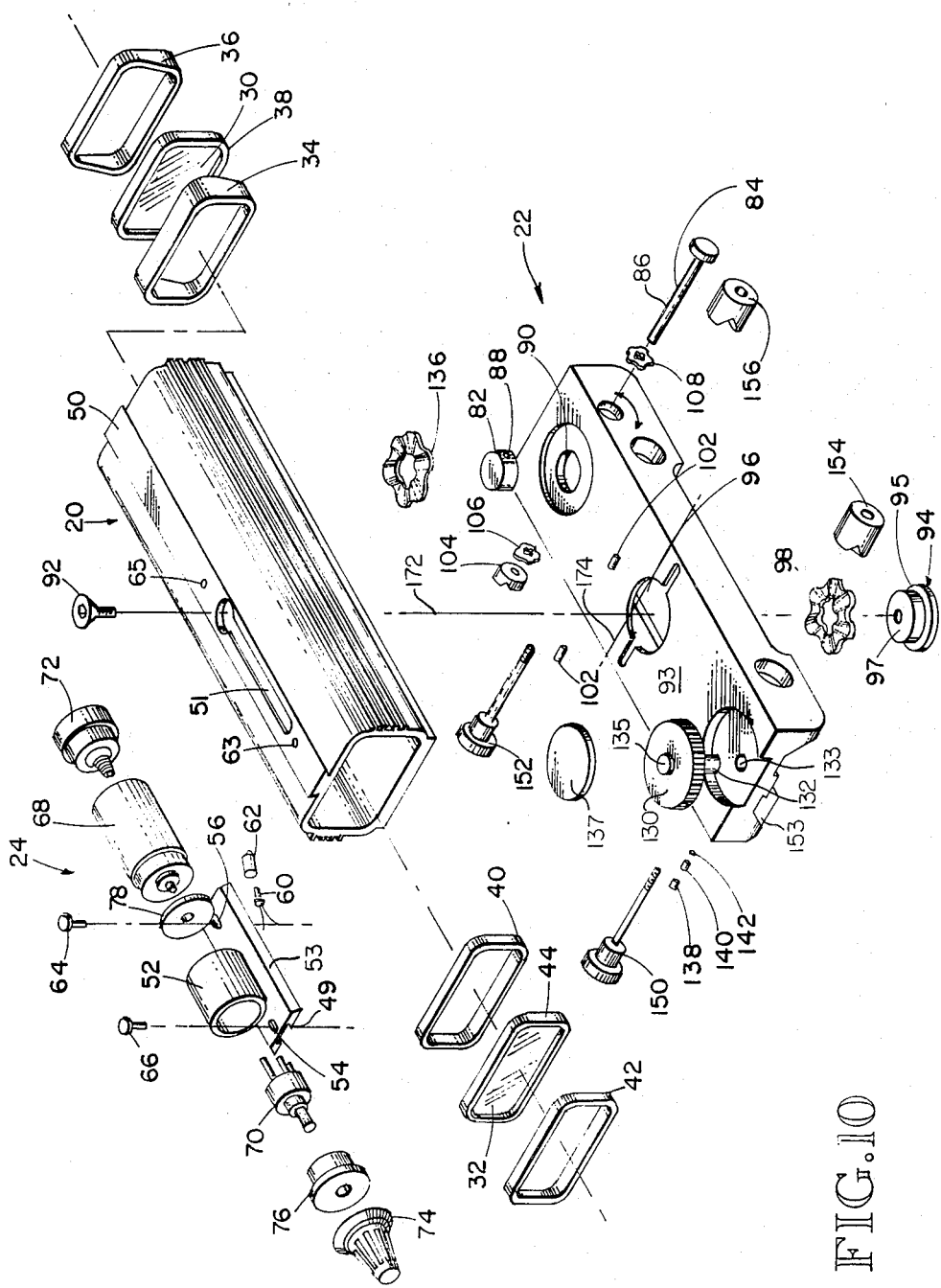
Figure 1:
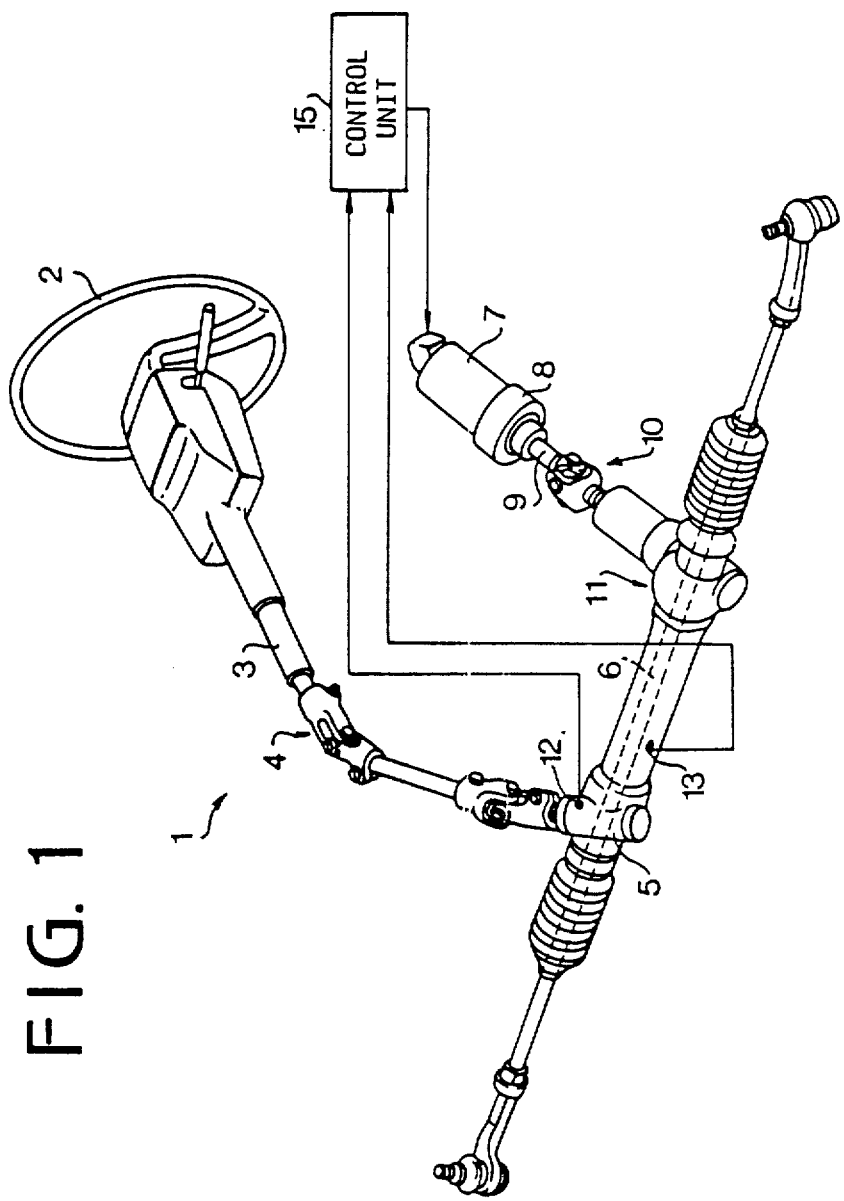
FIG. 1 is a perspective view showing a power steering system to which the present invention is applied.

Referring to FIG. 1, a steering system 1 is a rack-and-pinion type and comprises a steering wheel 2, steering shaft 3, joint 4, gear box 5, and rack 6. Another rack-and-pinion device 11 is provided for an electric power steering. A pinion of the device 11 is engaged with the rack 6. The pinion is operatively connected with an output shaft 9 of a reduction gear device 8 attached to a motor 7. A torsion torque sensor 12 is provided on gear box 5 for measuring the torsion torque of the steering shaft, and a steering angle sensor 13 is provided adjacent to the rack 6 so as to measure the axial movement of the rack 6 corresponding to the steering angle. Outputs of the sensors 12 and 13 are applied to a control unit 15 of the present invention.

Figure 2A:
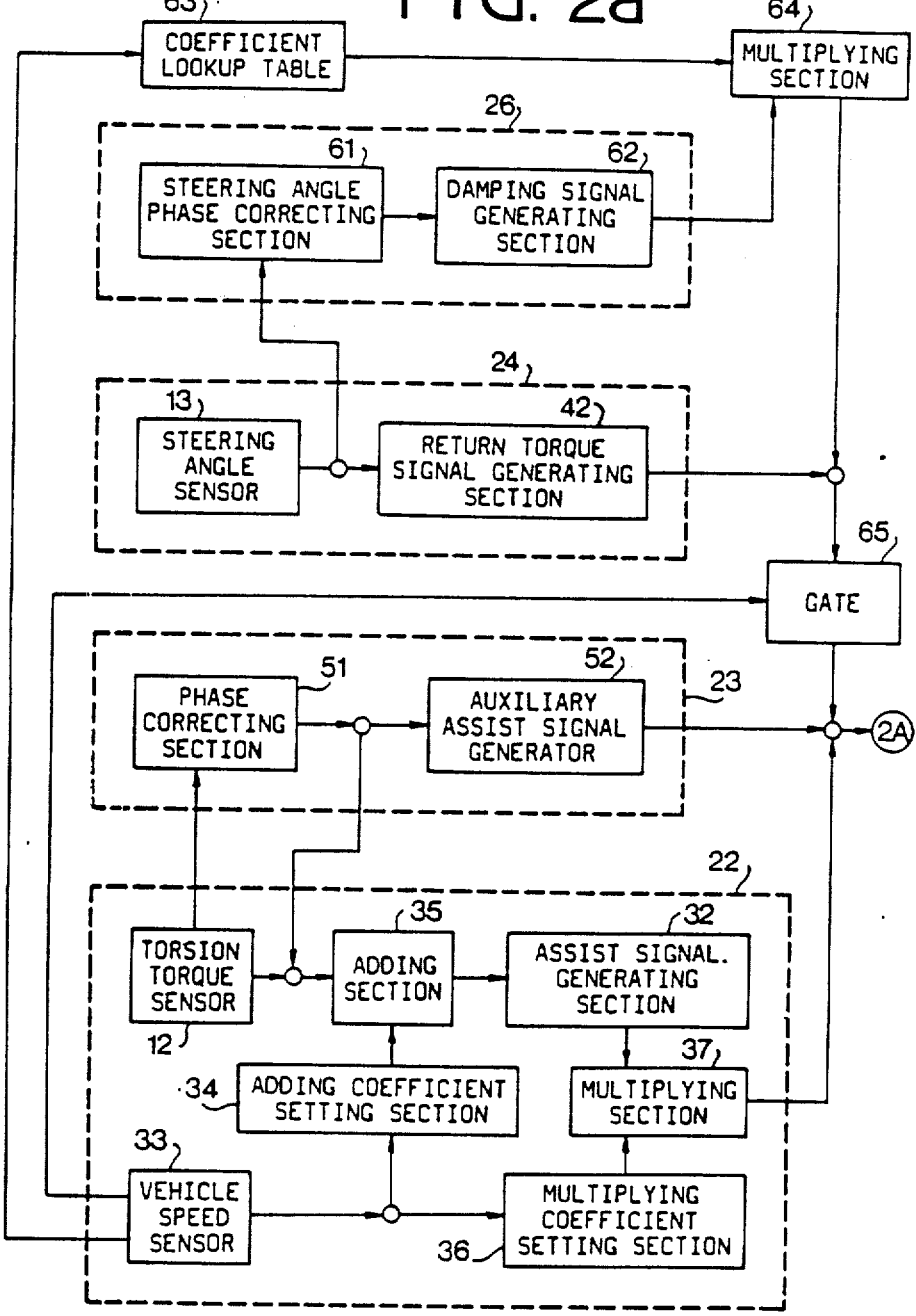
FIG. 2a and 2b show a block diagram of a system according to the present invention.
Figure 2B:
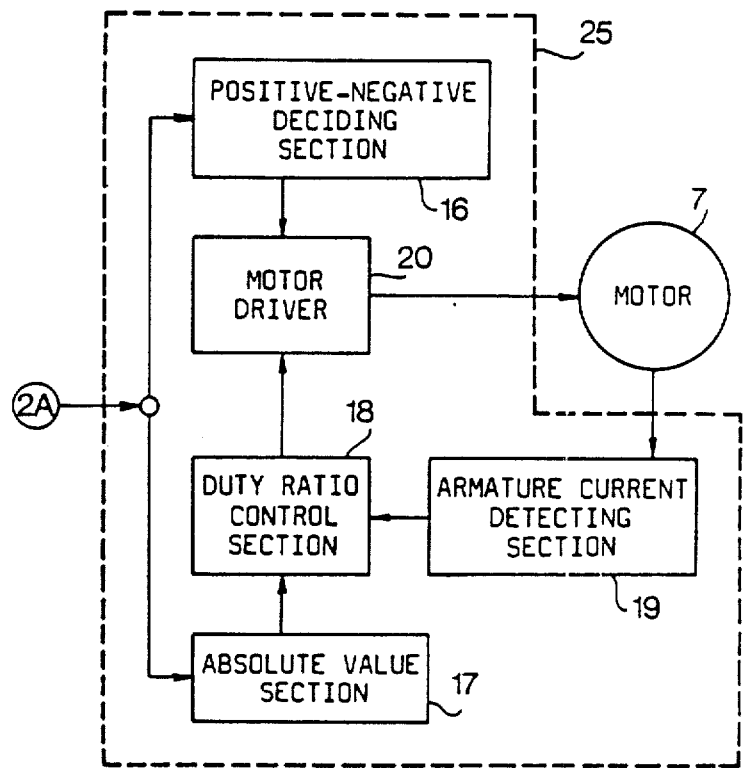

FIGS. 2a and 2b show the control unit 15 which comprises an assist command section 22, auxiliary assist command section 23, return command section 24, damping command section 26, and drive control section 25.

The assist command section 22 comprises the torsion torque sensor 12 and a vehicle speed sensor 33. The torsion torque sensor 12 produces an output signal representing the torsion torque and the direction of the torsion at the steering shaft. The output signal of the vehicle speed sensor 33 is applied to an adding coefficient signal setting section 34 and a multiplying coefficient setting section 36. The adding coefficient signal from the section 34 decreases as the vehicle speed increases. Outputs of the torsion torque sensor 12 and adding coefficient setting section 34 are added at an adding section 35 the output of which is applied to an assist signal is generated section 32. The assist signal generates from the section 32 when the torsion torque rises above a predetermined value and has a polarity dependent on the torsion torque direction of the steering shaft. On the other hand, the multiplying coefficient signal from the section 36 decreases with an increase of the vehicle speed. The assist signal is multiplied by the multiplying coefficient at a multiplying section 37, so that the assist signal is corrected.

The auxiliary assist command section 23 comprises a phase correcting section 51 applied with the output of the torsion sensor 12 for producing an output which is proportional to the differential of the output of the sensor 12. Namely, the output of the section 51 represents the speed of the variation of the torsion torque. The output of the phase correcting section 51 is applied to an auxiliary assist signal generating section 52. The output signal of the section 51 is also added to the output of the torsion torque sensor 12 and fed to the adding section 35, thereby correcting the phase of the assist signal and the phase of the auxiliary assist signal to control the operation of the motor.

The return command section 24 includes the steering angle sensor 13, the output signal of which is applied to a return torque signal generating section 42. The section 42 generates a return torque signal dependent on the steering angle.

Figure 3:
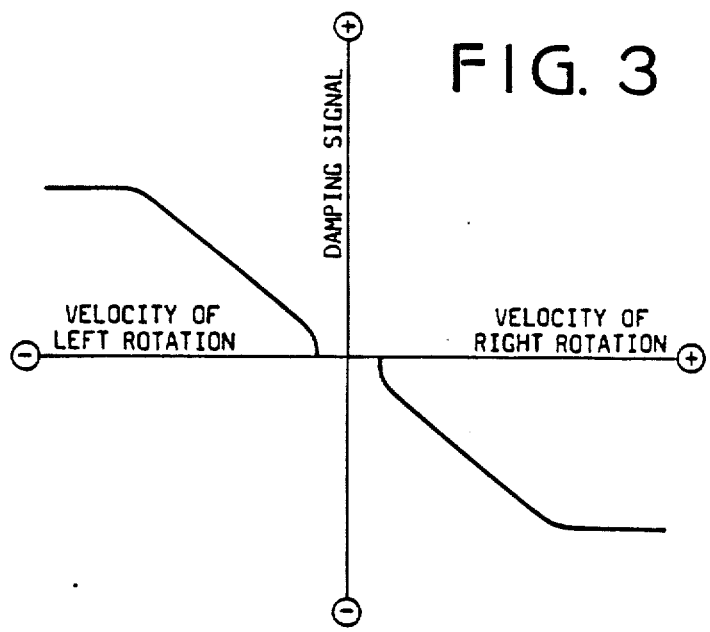
FIG. 3 is a graph showing a characteristic of a damping signal.

The damping command section 26 has a steering angle phase correcting section (angular velocity calculator means) 61 applied with the steering angle signal from the steering angle sensor 13 for producing an output (steering angular velocity signal) which is proportional to the differential of the steering angle signal of the sensor 13, and a damping signal generating section 62 responsive to the output of the section 61 for producing a damping signal. As shown in FIG. 3, the damping signal generates when the steering angular velocity exceeds a predetermined small value and increases with the increase of the steering angular velocity. When the steering angular velocity exceeds a predetermined large value, the damping signal becomes constant. The polarity (direction) of the damping signal is the reverse of the polarity (direction) of rotation of the steering wheel.

Figure 4:
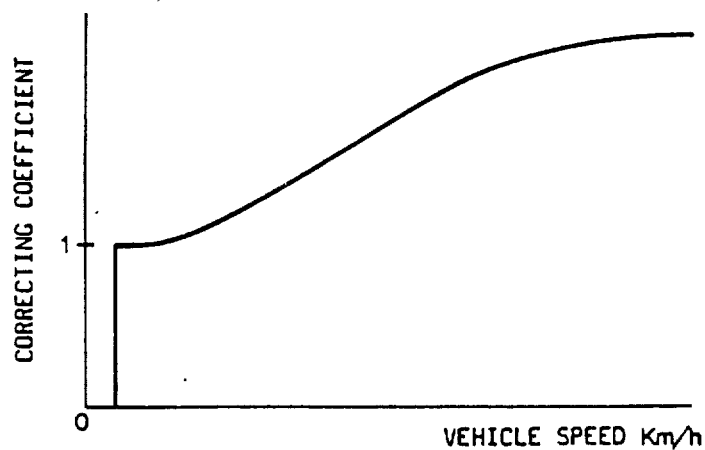
FIG. 4 is a graph showing a damping signal correcting coefficient dependent on vehicle speed.

The system of the present invention has a memory in a form of a damping signal correcting coefficient lookup table (storing means) 63 storing a plurality of damping signal correcting coefficients. As shown in FIG. 4, the coefficients are arranged to form a curve, the value of which starts from 1 at a low vehicle speed, for example 5 Km/h and increases as the vehicle speed increases. The vehicle speed signal from the vehicle speed sensor 33 is applied to the table 63, so that a coefficient derived from the table in accordance with the vehicle speed is fed to a multiplying section 64. The multiplying section 64 multiplies the damping signal from the section 62 by the coefficient to correct the damping signal. The corrected damping signal is added to the return torque signal from the section 42 at a first summing means represented by the upper right-hand circle of FIG. 2a. The summation of both signals are fed to a vehicle speed gate 65 which opens to pass the summation when the vehicle speed exceeds a predetermined speed, for example 5 Km/h.

The assist signal, auxiliary assist signal, and the sum of the corrected damping signal and the return torque signal are added and at a second summing means represented by the lower right-hand circle of FIG. 2a the summation total signal is 1 applied to a positive-negative deciding section 16 and an absolute value section 17 of the drive control section 25. The output of the positive-negative deciding section 16 is applied to the motor 7 through a motor driver 20. The output signal of the absolute value section 17 is applied to a duty ratio control section 18 which produces a pulse train. The pulse train is applied to the driver 20 so that the output torque of the motor 7 is controlled by the duty ratio of the pulse train. The output torque of the motor is fed back to the duty ratio control section 18 by an armature current detecting section 19.

In operation, when a torsion torque is generated by a steering operation, an assist signal is generated from the assist command section 22.

In response to the output of the phase correcting section 51, the auxiliary assist signal generating section 52 generates an auxiliary assist signal. The auxiliary assist signal is added to the assist signal.

On the other hand, the return command section 24 produces a return torque signal. The return torque signal increases with the increase of an steering angle until a predetermined angle after which it has a constant value. The polarity and absolute value of the summation of the signals are detected at the section 17 and a duty ratio of the pulse train for driving the motor 7 is determined in accordance with the absolute value at the section 18, so that the output torque of the motor 7 is controlled to reduce the steering effort. When the steering wheel is released from the driver's hands, the motor 7 operates to return the steering wheel in accordance with the return torque signal.

When the steering wheel is quickly turned during the driving of a vehicle, the rotational velocity of the steering angle is detected by the steering angle phase correcting section 61. The output of the section 61 is applied to damping signal generating section 62 which produces a damping signal shown in FIG. 3. The damping signal has a reverse polarity to the rotational direction of the steering wheel. The damping signal is multiplied by the coefficient from the table 63 in accordance with vehicle speed. The corrected damping signal is added to the return torque signal from the section 42, and the summation passes the gate 65 and is added to the total assist signal. The damping signal to produce a total signal for driving the motor 7 acts in the reverse direction to the rotational direction of the steering wheel to damp the oscillation of the steering wheel.

Since the correcting coefficient derived from the coefficient lookup table 63 increases with an increase of the coefficients increase with an increase of the vehicle speed, the corrected damping signal also increases with the vehicle speed. Accordingly, the convergency of the steering wheel is improved in a whole range of vehicle speed.

While the presently preferred embodiment of the present invention has been shown and described, it is to be understood that this disclosure is for the purpose of illustration and that various changes and modifications may be made without departing from the scope of the invention as set forth in the appended claims.

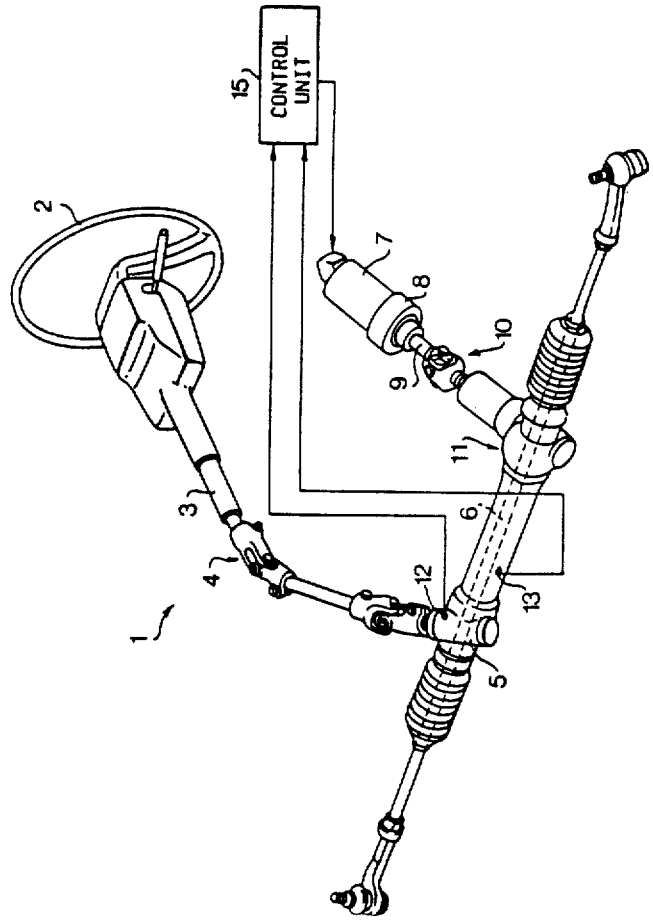

What is claimed is:

1. In an electric power steering system having a motor operatively connected to a steering system for reducing steering effort, a vehicle speed sensor for producing a vehicle speed signal representing vehicle speed, a torsion torque sensor provided for detecting torsion torque generated in the steering system in a steering operation, assist means responsive to an output signal of the torsion torque sensor for producing an assist signal, a steering angle sensor provided for detecting steering angle of a steering wheel for producing a steering angle signal representing the steering angle, return torque means responsive to said steering angle signal for producing a return torque signal for returning said steering wheel, the improvement comprising:

angular velocity calculator means for differentiating the steering angle signal and for producing an angular velocity signal representing angular velocity of the steering wheel;

damping means responsive to said angular velocity signal for producing a damping signal having a reverse polarity to rotational direction of the steering wheel;

storing means for storing a plurality of coefficients which increase in value with increasing vehicle speed;

said storing means being responsive to said vehicle speed signal for deriving from said storing means the coefficient corresponding to the vehicle speed represented by said vehicle speed signal;

multiplying means for multiplying said damping signal by the derived coefficient and for producing a corrected damping signal;

summing means for summing said assist signal, said return torque signal and said corrected damping signal for producing a total signal;

driving means responsive to said total signal for driving the motor, whereby the steering wheel is returned by the total signal of said return torque signal and said corrected damping signal, the latter increasing in value with increase of the vehicle speed, when said assist signal disappears upon as driver releasing the steering wheel.

2. The system according to claim 1, wherein said damping means produces said damping signal such that said damping signal increases in value with increase of the angular velocity of the steering wheel.

3. The system according to claim 1, wherein said damping means produces said damping signal when said angular velocity exceeds a predetermined small value.

4. The system according to claim 3, wherein said damping means produces said damping signal such that said damping signal becomes constant when said angular velocity exceeds a predetermined large value.

5. The system according to claim 1, wherein said coefficients include a lowest coefficient equal substantially to 1 for vehicle speeds lower than a predetermined low vehicle speed.

6. The system according to claim 5, wherein said predetermined low vehicle speed is approximately 5 km/h.

7. The system according to claim 1, wherein said summing means includes a first summing means and a second summing means, said first summing means is for summing said return torque signal and said corrected damping signal, and gate means responsive to said vehicle speed signal for passing the sum of said return torque signal and said corrected damping signal to said second summing means when the vehicle speed represented by said vehicle speed signal exceeds a predetermined low vehicle speed, and said second summing means adds said return torque signal and said corrected damping signal and said assist signal for producing said total signal.

8. In an electric power steering system having a motor operatively connected to a steering system for reducing steering effort, a vehicle speed sensor for producing a vehicle speed signal representing vehicle speed, a torsion torque sensor provided for detecting torsion torque generated in the steering system in a steering operation, assist means responsive to an output signal of the torsion torque sensor for producing an assist signal, a steering angle sensor provided for detecting steering angle of a steering wheel for producing a steering angle signal representing the steering angle, return torque means responsive to said steering angle for producing a return torque signal for returning said steering wheel, the improvement in the electric power steering system comprising:

steering angle phase correcting means for producing an angular velocity signal representing angular velocity of the steering wheel by differentiating said steering angle signal;

damping means responsive to said angular velocity signal for producing a damping signal having a reverse polarity to rotational direction of the steering wheel;

coefficient lookup table means for storing a plurality of coefficients which increases in value with increase of the vehicle speed;

said table means being responsive to the vehicle speed signal for deriving from said table means said coefficient corresponding to said vehicle speed represented by said vehicle speed signal;

multiplying means for multiplying said damping signal by said derived coefficient and for producing a corrected damping signal;

summing means for summing said assist signal, return torque signal and said corrected damping signal for producing a total signal; and driving means responsive to said total signal for driving the motor, whereby the steering wheel is returned by said total signal of said return torque signal and said corrected damping signal, the latter increasing in value with increasing of said vehicle speed, when said steering wheel is automatically returned at releasing of the steering wheel.

* * * * *

UNITED STATES PATENT AND TRADEMARK OFFICE
CERTIFICATE OF CORRECTION

PATENT NO. : 4,957,181

DATED : September 18, 1990

INVENTOR(S) : Saiichiro Oshita et al

It is certified that error appears in the above-identified patent and that said Letters Patent is hereby corrected as shown below:

The title page should be deleted to appear as per attached title page.

The four sheets of drawings consisting of Figs. 1-14 should be deleted to appear as per attached pages.

Signed and Sealed this

Fifth Day of May, 1992

Attest:

DOUGLAS B. COMER

*Attesting Officer*  *Acting Commissioner of Patents and Trademarks*

United States Patent [19]

Oshita et al.

[11] Patent Number: 4,957,181
[45] Date of Patent: Sep. 18, 1990

[54] ELECTRIC POWER STEERING SYSTEM

[75] Inventors: Saiichiro Oshita; Toyohiko Mouri, both of Ohta, Japan

[73] Assignee: Fuji Jukogyo Kabushiki Kaisha, Tokyo, Japan

[21] Appl. No.: 449,131

[22] Filed: Dec. 8, 1989

Related U.S. Application Data

[63] Continuation of Ser. No. 198,393, May 24, 1988, abandoned.

[30] Foreign Application Priority Data

May 25, 1987 [JP] Japan .................. 62-127427

[51] Int. Cl.⁵ .................................................. B62D 5/04
[52] U.S. Cl. ...................................... 180/79.1; 180/142;
318/434; 318/448; 318/489; 364/424.05
[58] Field of Search ................. 180/79.1, 79, 141, 142,
180/143; 318/434, 448, 488, 489; 361/31;
364/424.05

[56] References Cited

U.S. PATENT DOCUMENTS

| | | | |
|---|---|---|---|
| 4,664,211 | 5/1987 | Oshita et al. | 180/142 |
| 4,674,587 | 6/1987 | Suzuki et al. | 180/79.1 |
| 4,688,655 | 8/1987 | Shimizu | 180/79.1 |
| 4,735,271 | 4/1988 | Shimizu | 180/142 X |
| 4,754,829 | 7/1988 | Shimizu | 180/142 X |

FOREIGN PATENT DOCUMENTS 45-41246 12/1970 Japan.
61-98675 5/1986 Japan.

*Primary Examiner*—Mitchell J. Hill
*Attorney, Agent, or Firm*—Martin A. Farber

[57] ABSTRACT

A system having a motor operatively connected to a steering system for reducing the steering effort. The system is provided with a torsion torque sensor provided for detecting torsion torque generated in the steering system in a steering operation, and a steering angle sensor provided for detecting steering angle. In response to the output signal of the torsion torque sensor, an assist signal is produced, and in response to the output of the steering angle sensor, a damping signal dependent on the steering speed of a steering wheel is produced. The damping signal is increased with an increase of vehicle speed. A corrected damping signal is added to the assist signal, thereby damping movement of the steering wheel.

8 Claims, 4 Drawing Sheets